US012620694B2

(12) United States Patent
Huang et al.

(10) Patent No.: US 12,620,694 B2
(45) Date of Patent: May 5, 2026

(54) ANTENNA DEVICE AND ANTENNA MODULE THEREOF

(71) Applicant: Luxshare Precision Industry (Kunshan) Co., Ltd., Kunshan City (CN)

(72) Inventors: Chao Huang, Kunshan City (CN); HaoQiang Lei, Kunshan City (CN); Xu Zhang, Kunshan City (CN); YanSong Chen, Kunshan City (CN); YangQiu Cao, Kunshan City (CN); HaiBo Ma, Kunshan City (CN)

(73) Assignee: LUXSHARE PRECISION INDUSTRY (KUNSHAN) CO., LTD., Kunshan City (CN)

( * ) Notice: Subject to any disclaimer, the term of this patent is extended or adjusted under 35 U.S.C. 154(b) by 86 days.

(21) Appl. No.: 18/406,421

(22) Filed: Jan. 8, 2024

(65) Prior Publication Data

US 2024/0266720 A1 Aug. 8, 2024

(30) Foreign Application Priority Data

Feb. 2, 2023 (CN) ........................ 202310152373.X

(51) Int. Cl.
*H01Q 1/32* (2006.01)
*H01Q 1/48* (2006.01)
*H01Q 5/335* (2015.01)

(52) U.S. Cl.
CPC ................. *H01Q 1/32* (2013.01); *H01Q 1/48* (2013.01); *H01Q 5/335* (2015.01)

(58) Field of Classification Search
CPC .. H01Q 1/38; H01Q 1/48; H01Q 1/52; H01Q 9/0407; H01Q 5/30–40
See application file for complete search history.

(56) References Cited

U.S. PATENT DOCUMENTS 7,808,442 B2 * 10/2010 Chiu .................... H01Q 9/0421 343/846
11,831,076 B2 * 11/2023 Yoshikawa .............. H01Q 5/40
(Continued)

FOREIGN PATENT DOCUMENTS

CN 101320838 A 12/2008
CN 104753554 A 7/2015
(Continued)

OTHER PUBLICATIONS

Chinese Office Action and Search Report for Chinese Application No. 202310152373.X, dated Jan. 28, 2026, with English translation.

*Primary Examiner* — Hasan Islam

(74) *Attorney, Agent, or Firm* — Birch, Stewart, Kolasch & Birch, LLP

(57) ABSTRACT

A vehicle antenna device and an antenna module thereof are disclosed. The antenna module has an antenna radiation area with a first and second antenna radiation areas, the first antenna radiation area is disposed and adjacent to the second antenna radiation area along a first direction, and has a first length along a second direction, the second antenna radiation area has a second length along the second direction; a first ground area, disposed along the second direction and corresponded to the first antenna radiation area, a first distance along the second direction is between the first ground area and the first antenna radiation area, and a second ground area, disposed along the second direction and corresponded to the second antenna radiation area, a second distance along the second direction is between the second ground area and the second antenna radiation area.

16 Claims, 6 Drawing Sheets

(56) References Cited

U.S. PATENT DOCUMENTS

| | | | | |
|---|---|---|---|---|
| 11,855,331 | B2 * | 12/2023 | Jung | H01Q 5/25 |
| 12,469,951 | B2 * | 11/2025 | Kim | H01Q 1/48 |
| 2009/0224979 | A1 | 9/2009 | Chiu et al. | |
| 2020/0083603 | A1 | 3/2020 | Wu et al. | |
| 2020/0091608 | A1 | 3/2020 | Alpman et al. | |

FOREIGN PATENT DOCUMENTS

| | | | |
|---|---|---|---|
| CN | 206401522 | U | 8/2017 |
| CN | 109962329 | A | 7/2019 |
| CN | 213636307 | U | 7/2021 |
| CN | 114865298 | A | 8/2022 |
| EP | 1077505 | B1 | 11/2004 |
| KR | 10-2016-0120650 | A | 10/2016 |
| TW | 200803043 | A | 1/2008 |
| TW | 200803052 | A | 1/2008 |

* cited by examiner

ANTENNA DEVICE AND ANTENNA MODULE THEREOF

CROSS REFERENCE TO RELATED APPLICATION

This application claims the priority benefits of Chinese Patent Application Serial Number 202310152373.X, filed on Feb. 22, 2023, the full disclosure of which is incorporated herein by reference.

BACKGROUND

Technical Field

The present invention is in related to an antenna device and an antenna module thereof, more particularly to a vehicle antenna device and an antenna module thereof.

Related Art

With the development for the smart car industry, the increasing requirements for wireless communication inside the car, for example, watching video streams or communicating with smart electronic devices, etc. Therefore, the data transmission rate and data transmission amount inside the car are continuously more for the needs than ever.

In prior arts, most of the vehicle antennas are limited to the frequency bands of Bluetooth and Wi-Fi 5 according to the frequency band requirements of the existing system. On the other hand, the vehicle antennas are mostly designed as a type of PCB (Printed Circuit Board) antenna for controlling the cost. Based on the design conditions of the PCB antenna, the positions for disposing the wires of the antenna are not many, so as to cause the results of narrow bandwidth and low efficiency.

In view of this, how to provide a vehicle antenna device and an antenna module thereof, so that it can be applied to existing Bluetooth and Wi-Fi systems, and more support the ultra-wide-band spectrum range, in order to improve the overall transmission efficiency, is for the problems to be solved in the field.

SUMMARY

The present invention discloses a vehicle antenna device and an antenna module thereof, which is able to figure out the problems of narrow bandwidth and low efficiency.

The present invention provides an antenna module, which has an antenna radiation area, a first ground area and a second ground area. The antenna radiation area has a first antenna radiation area and a second antenna radiation area. The first antenna radiation area is disposed and adjacent to the second antenna radiation area along a first direction, the first antenna radiation area has a first length along a second direction, the second antenna radiation area has a second length along the second direction, and the second length is less than the first length. The first ground area is disposed along the second direction and corresponded to the first antenna radiation area, and a first distance along the second direction is between the first ground area and the first antenna radiation area. The second ground area is disposed along the second direction and corresponded to the second antenna radiation area, and a second distance along the second direction is between the second ground area and the second antenna radiation area.

The other embodiment of the present invention is the vehicle antenna device, which has the antenna module, a high speed connector and an antenna protection box. The antenna protection box is wrapped around the antenna module and exposes the high speed connector.

The present invention provides the vehicle antenna device and the antenna module thereof, which use the first antenna radiation area and the second antenna radiation area to generate resonant frequencies applied to existing Bluetooth and Wi-Fi systems, and generate an ultra-high frequency resonant frequency in a ground-feed coupling manner as well for applying to the existing Bluetooth and Wi-Fi systems, so as to support the ultra-wideband spectrum range and improve the overall transmission efficiency.

The accompanying drawings are incorporated in and constitute a part of this application and, together with the description, serve to explain the principles of the invention in general terms. Like numerals refer to like parts throughout the disclosure.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
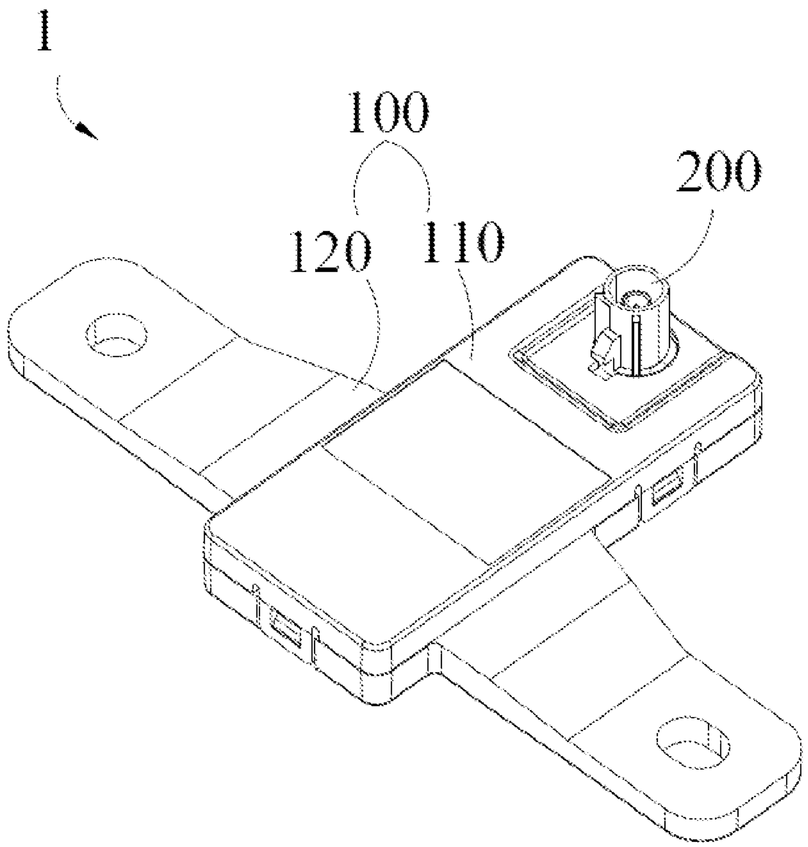
FIG. 1 illustrates a schematic 3-D view of an embodiment of the vehicle antenna device of the present invention.
Figure 2:
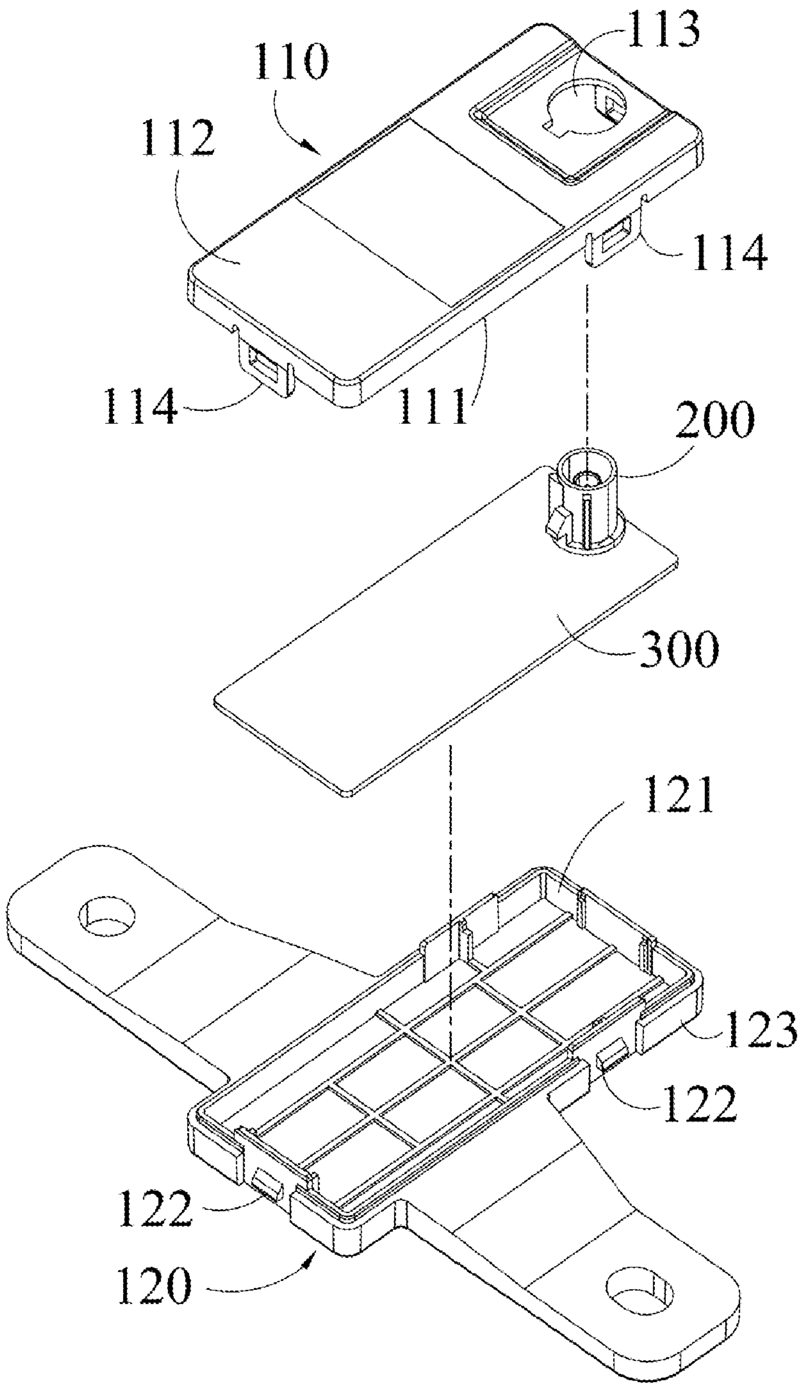
FIG. 2 illustrates a schematic exploded view of the embodiment of the vehicle antenna device of the present invention.

Please refer to FIG. 1 and FIG. 2, which illustrate two schematic views of an embodiment of the vehicle antenna device of the present invention. The vehicle antenna device 1 includes an antenna protection box 100, a connector 200 and an antenna module 300, wherein the connector 200 is disposed on and connected with the antenna module 300.

Further that, the antenna protection box 100 has an upper box 110 and a lower box 120.

The upper box 110 has an inner surface 111, an outer surface 112 and an opening 113 through the inner surface 111 and the outer surface 112. The upper box 110 has a plurality of fixing portions 114, which are disposed on the inner surface 111 of the upper box 110 and elongated from the inner surface 111 to the outer surface 112.

The lower box 120 has an accommodation space 121 constructed by a lateral edge 123, in order to contain both the connector 200 and the antenna module 300 that are connected with each other. The antenna module 300, toward the accommodation space 121, is disposed in the accommodation space 121. The connector 200 is disposed and toward the upper box 110. The lower box 120 has a plurality of fastening elements 122, which are disposed on the lateral edge 123 of the lower box 120. The fastening elements 122 correspond to the fixing portions 114 of the upper box 110. The fastening elements 122 match up the fixing portions 114, so as to combine the upper box 110 and the lower box 120 in a manner of sandwiching/clamping. Hence, the connector 200, contained in the accommodation space 121 of the lower box 120, and the antenna module 300 are sandwiched by the upper box 110 and the lower box 120. The connector 200 is exposed out from the opening 113 of the upper box 110 to form the embodiment of the vehicle antenna device 1 of the present invention.

As for an embodiment, the fixing portions 114 are buckle structures, but not limited thereto.

For another embodiment, the fastening elements 122 correspond to the fixing portions 114, and the fastening element 122 is a bump structure, but also not limited thereto.

In one embodiment, the antenna protection box 100 is made of Polycarbonate Acrylonitrile Butadiene Styrene Blend (PC and ABS), but it may not be limited for the present invention.

Figure 3:
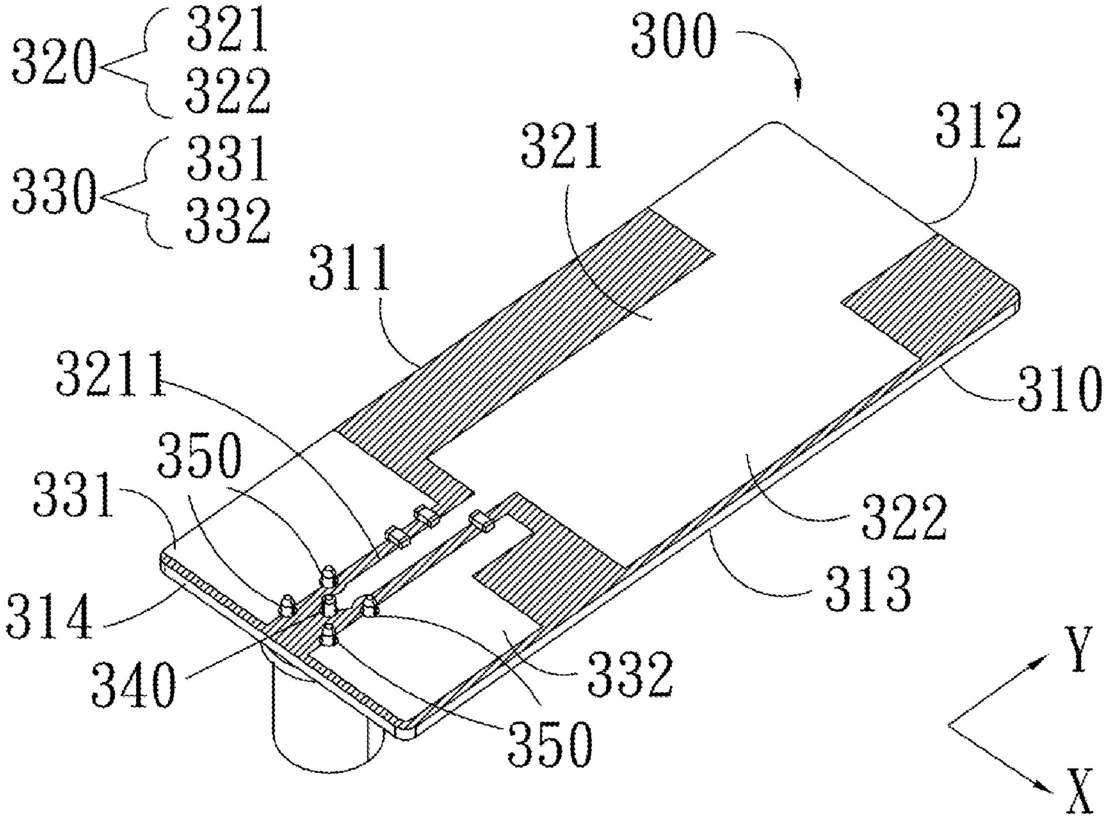
FIG. 3 illustrates a schematic 3-D view of an embodiment of the antenna module of the present invention.
Figure 4:
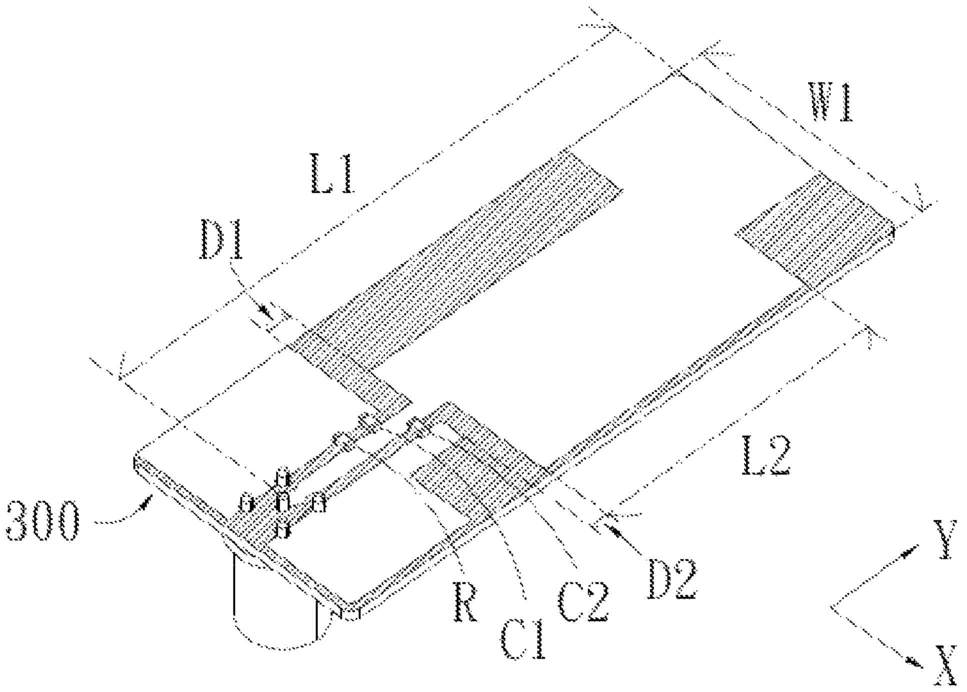
FIG. 4 illustrates a schematic 3-D view of another embodiment of the antenna module of the present invention.

With reference to FIG. 3 and FIG. 4, which illustrate schematic views of an embodiment of the antenna module of the present invention. The antenna module 300 includes a substrate 310 and an antenna layer that forms the substrate 310. The substrate 310 defines a first long side 311, a second long side 313, a first short side 312, and a second short side 314. The first long side 311 and the second long side 313 correspond to each other, and the first short side 312 and the second short side 314 do so as well. The two ends of the first short side 312 are connected with the one end of the first long side 311 and the one end of the second long side 313 individually, and the other two ends of the second short side 314 are in contact with the other two ends of the first long side 311 and the second long side 313 as well.

Further, the antenna layer defines an antenna radiation area 320 and a ground area 330. The antenna radiation area 320 includes a first antenna radiation area 321 and a second antenna radiation area 322. The first antenna radiation area 321 is disposed and adjacent to the second antenna radiation area 322 for connection along a first direction X. More, the first antenna radiation area 321 is disposed on the substrate 310 and close to one side of the first long side 311, and forms a pattern of ascending stairs along a second direction Y, wherein the pattern has a first length L1 along the second direction Y. The second antenna radiation area 322 is disposed on the substrate 310 and close to one side of the second long side 313, and forms another pattern of ascending stairs along the second direction Y, wherein the pattern has a second length L2 along the second direction Y. Besides, the second length L2 is less than the first length L1.

In the present embodiment, the range of the first length L1 is between 54.3 and 54.7 mm. In an embodiment, the better option of the first length L1 is 54.5 mm.

In the present embodiment, the range of the second length L2 is between 25 and 27 mm. In an embodiment, the better option of the second length L2 is 26 mm.

Additionally, the antenna radiation area defines a trace width W1, which is a traceable length of the first antenna radiation area 321 and the second antenna radiation area 322 along the first direction X on the substrate 310. For the current embodiment, the trace width W1 is the same length as the first short side 312. Again, in the embodiment, the trace width W1 is equal to or less than 23 mm, and greater than 0 mm, but if there is another embodiment, the trace width W1 is preferable to be 23 mm.

Therefore, the present invention increases the transmission bandwidth of the antenna module 300 by enlarging the trace width W1 of the antenna radiation area 320 as much as possible, so as to support the ultra-wideband spectrum range and improve the overall transmission efficiency. Accordingly, in the present invention, a resonance frequency of 2.4-2.5 GHz can be generated through the first antenna radiation area 321, and a resonance frequency of 5.150-5.850 GHz can also be generated through the second antenna radiation area 322. At the same time, the antenna radiation area 320 of the present application is with a larger radiation area and constitutes a high-gain single-stage omnidirectional antenna structure, which is able to ensure that the communication requirements of the system is applied in harsh communication environments.

Further discussion, the ground area 330 defines a first ground area 331 and a second ground area 332. The first ground area 331 is disposed on the substrate 310 and close to the one side of the first long side 311, and forms a pattern of ascending stairs along the second direction Y. The first ground area 331 is disposed along the second direction Y and corresponds to the first antenna radiation area 321, and a first distance D1 is between the first ground area 331 and the and the first antenna radiation area 321 along the second direction Y. The second ground area 332 is disposed on the substrate 310 and neighbor to the one side of the second long side 313, and forms a pattern of hexagon along the second direction Y. The second ground area 332 is disposed along the second direction Y and corresponds to the second antenna radiation area 322, and a second distance D2 is between the second ground area 332 and the second antenna radiation area 322. Hence, The antenna module 300 of this embodiment can generate an ultra-high frequency resonant frequency above 6 GHz in a ground-feed coupling manner, so as to support the ultra-wideband spectrum range and improve the overall transmission efficiency. Besides, via adjusting the first distance D1 and the second distance D2, the ground-feed coupling effects of the first antenna radiation area 321, the second antenna radiation area 322, the first ground area 331, and the second ground area 332 are controlled.

In one embodiment, the second ground area 332 is a square pattern, but it may not be limited any further.

In the present embodiment, the range of the first distance D1 is between 1.5 and 2.5 mm. In an embodiment, the better option of the first distance D1 is 2 mm.

In the present embodiment, the range of the second distance D2 is between 2 and 3 mm. In an embodiment, the better option of the second distance D2 is 2.5 mm.

Consistently, as for another embodiment, the antenna radiation area 320 and the ground area 330 are formed on the substrate 310 by means of etching. As it can be seen, the antenna module 300 has an easy and simple structure without a large number of elements to sandwich and fix the antenna protection box 100, in order to tightly assembly the vehicle antenna device 1 for adapting to the high-temperature, high-humidity and vibration working environment of vehicle specifications.

More, the first antenna radiation area 321 defines a feed-in area 3211, which is elongated to a position between the first ground area 331 and the second ground area 332 along the second direction Y. In addition, the antenna module 3X) further includes a first through hole 340 and a plurality of second through holes 350. The first through hole 340 is disposed on the substrate 310 and neighbor to one side of the second short side 314, more, the first through hole 340 is connected with the feed-in area 3211 of the first antenna radiation area 321. The plurality of second through holes 350 are around the first through hole 340 and disposed on the substrate 310, and additionally the second through holes 350 are close to the one side of the second short side 314 and connected with the first ground area 331 or the second ground area 332. As for the current embodiment, the two second through holes 350 are connected with the first ground area 331, and the other two second through holes 350 are connected through the second ground area 332.

For the present invention, the connector 200 is disposed on a side, away from the antenna layer, of the substrate 310. The pins of the connector 200 are in contact with the first through hole 340 and the plurality of second through holes 350, so that the connector 200 is electrically connected with the feed-in area 3211 of the first antenna radiation area 321, the first ground area 331 and the second ground area 332 by means of those pins. In this way, the antenna radiation signals are fed into the antenna radiation area 320 through the connector 200 and the first through hole 340. What is more, the first ground area 331 and the second ground area 332 are grounded to a ground end of a terminal system through the connected connector 200.

Moreover, the antenna module 300 further includes a first variable capacitor C1 and a second variable capacitor C2. The first variable capacitor C1 is disposed between the first antenna radiation area 321 and the first ground area 331 along the first direction X. An end of the first variable capacitor C1 is connected with the feed-in area 3211 of the first antenna radiation area 321, and another end of the first variable capacitor C1 is in contact with the first ground area 331. The second variable capacitor C2 is disposed between the first antenna radiation area 321 and the second ground area 332 along the first direction X. An end of the second variable capacitor C2 is connected with the feed-in area 3211 of the first antenna radiation area 321, and another end of the second variable capacitor C2 is in contact with the second ground area 332. The antenna module 300 can be through choosing the capacitor values of the first variable capacitor C1 and the second variable capacitor C2 to maintain the input impedance of the antenna module 300 at 50 ohms, so as to achieve the best matching effect with the terminal system.

Further, the antenna module 300 further includes a detection resistor R, which is disposed between the first antenna radiation area 321 and the first ground area 331 along the first direction X. An end of the detection resistor R is connected with the feed-in area 3211 of the first antenna radiation area 321, and another end is in contact with the first ground area 331.

Figure 5:
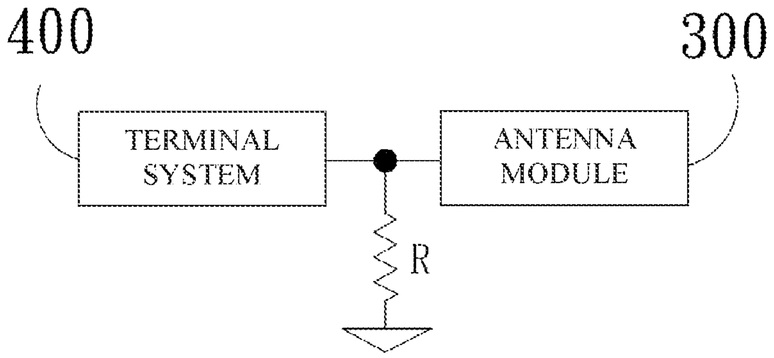
FIG. 5 illustrates a schematic view of an embodiment of electrical connections of a detection resistor of the present invention.

In regard to FIG. 5, which illustrates a schematic view of an embodiment of electrical connections of the detection resistor, the terminal system and the antenna module 300 of the present invention. According to aforesaid configurations, one end of the detection resistor R, the terminal system 400 and the antenna module 300 are electrically connected with each other, and another end of the detection resistor R is grounded. When the antenna module 300 is disconnected, the cross voltage measured by the detection resistor R is the voltage value of the output end of the terminal system 400. When the antenna module 300 is short-circuited, the cross-voltage measured by the detection resistor R is zero due to the short-circuit; when the antenna module 300 operates normally, the cross-voltage measured by the detection resistor R is a predetermined voltage value, and the predetermined voltage value is less than the voltage value output by the terminal system 400. Therefore, by measuring the cross-voltage of the detection resistor R, the state of the antenna module 300 (short circuit, open circuit or normal) can be quickly confirmed, and the detection convenience of the antenna module 300 can be improved.

Figure 6:
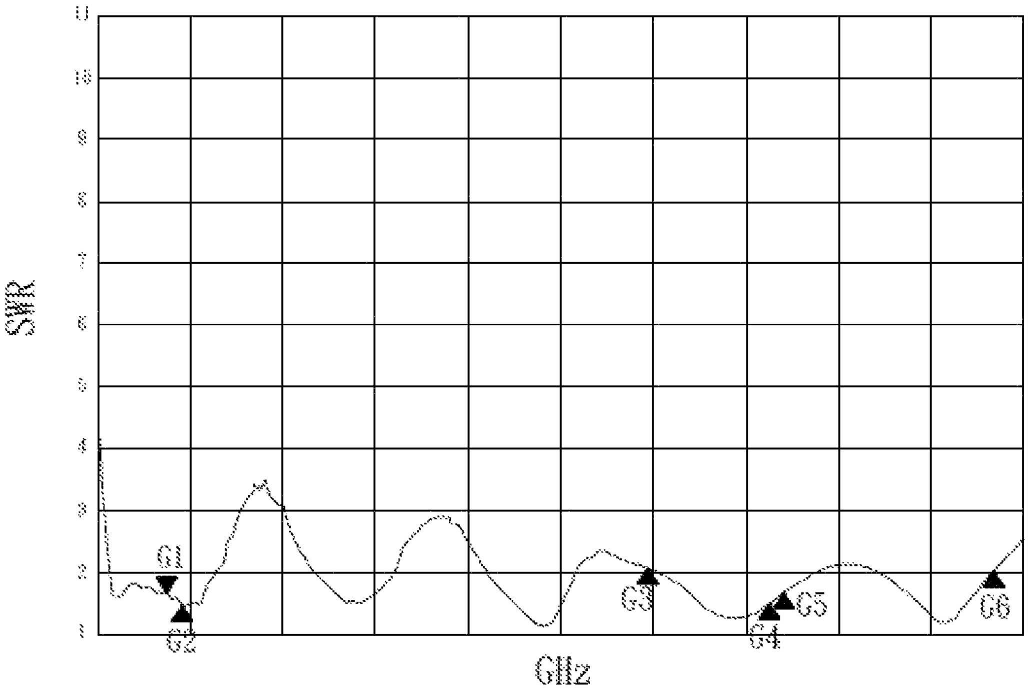
FIG. 6 illustrates a schematic standing wave ratio (SWR) performance view of an embodiment of the antenna module of the present invention.

Please refer to FIG. 6, which illustrates a schematic standing wave ratio (SWR) performance view of an embodiment of the antenna module under different frequencies of the present invention, wherein G1 represents an SWR value of the antenna module at the frequency of 2.400 GHz, G2 represents an SWR value of the antenna module at the frequency of 2.480 GHz, G3 represents an SWR value of the antenna module at the frequency of 5.150 GHz, G4 represents an SWR value of the antenna module at the frequency of 5.850 GHz, G5 represents an SWR value of the antenna module at the frequency of 5.925 GHz, and G1 represents an SWR value of the antenna module at the frequency of 7.125 GHz. It can be seen from FIG. 6 that the embodiment of the antenna module of the present application (such as that described in FIG. 3) maintains a standing wave ratio below 2 in different frequency bands, that is, the embodiment of the antenna module of the present application and the terminal system both are excellently matched with each other.

As a conclusion, the vehicle antenna device and the antenna module proposed in the invention not only generate resonant frequencies applied to existing Bluetooth and Wi-Fi systems, but also support the resonant frequency of the spectrum range of the ultra-wide-band, so as to achieve the purpose of supporting the spectrum range of the ultra-wide-band to improve the overall transmission efficiency. Accordingly, the antenna module of the present invention has a simple structure and may not be with a large number of elements to be applied. Therefore, it can be fixed in the antenna protection box by means of sandwiching, so as to let the structures of the vehicle antenna device and the antenna module be tightly assembled, and suitable for the working environment of vehicle specifications.

Although the present disclosure is disclosed in the fore going embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. An antenna module, comprising:

a substrate, comprising:

an antenna radiation area having a first antenna radiation area and a second antenna radiation area, the first antenna radiation area being disposed and adjacent to the second antenna radiation area along a first direction, the first antenna radiation area having a first length along a second direction, the second antenna radiation area having a second length along the second direction, the second length being less than the first length;

a first ground area disposed along the second direction and corresponded to the first antenna radiation area, a first distance along the second direction being between the first ground area and the first antenna radiation area;

a second ground area disposed along the second direction and corresponded to the second antenna radiation area, a second distance along the second direction being between the second ground area and the second antenna radiation area; and a detection resistor, disposed in between the first antenna radiation area and the first ground area along the first direction, the first antenna radiation area being connected with the first ground area.

2. The antenna module according to claim 1, wherein the first length is in a range of 54.3 to 54.7 mm.

3. The antenna module according to claim 1, wherein the second length is in a range of 25 to 27 mm.

4. The antenna module according to claim 1, wherein the first distance is in a range of 1.5 to 2.5 mm.

5. The antenna module according to claim 1, wherein the second distance is in a range of 2 to 3 mm.

6. The antenna module according to claim 1, wherein a trace width of the antenna radiation area is equal to or less than 23 mm.

7. The antenna module according to claim 1, wherein a feed-in area of the first antenna radiation area is elongated along the second direction to be in between the first ground area and the second ground area.

8. The antenna module according to claim 1, wherein the first antenna radiation area has a pattern of ascending stairs.

9. The antenna module according to claim 1 further comprising:

a first variable capacitance, disposed in between the first antenna radiation area and the first ground area along the first direction, the first antenna radiation area being connected with the first ground area; and a second variable capacitance, disposed in between the first antenna radiation area and the second ground area along the first direction, the first antenna radiation area being connected with the second ground area.

10. A vehicle antenna device, comprising:

the antenna module according to claim 1;

a high speed connector, connected with the antenna module; and an antenna protection box wrapped around the antenna module and exposing the high speed connector.

11. The vehicle antenna device according to claim 10, wherein the antenna protection box comprises an upper box and a lower box, which sandwich the antenna module in order to fix the antenna module in the antenna protection box.

12. The vehicle antenna device according to claim 10, wherein the antenna protection box is made of Polycarbonate Acrylonitrile Butadiene Styrene Blend.

13. The antenna module according to claim 1 further comprising:

a first variable capacitance, disposed in between the first antenna radiation area and the first ground area along the first direction, the first antenna radiation area being connected with the first ground area.

14. The antenna module according to claim 13 further comprising:

a second variable capacitance, disposed in between the first antenna radiation area and the second ground area along the first direction, the first antenna radiation area being connected with the second ground area.

15. The antenna module according to claim 1, wherein the first antenna radiation is connected to the second antenna radiation in the first direction.

16. An antenna module, comprising:

a substrate, comprising:

an antenna radiation area having a first antenna radiation area and a second antenna radiation area, the first antenna radiation area being disposed and adjacent to the second antenna radiation area along a first direction, the first antenna radiation area having a first length along a second direction, the second antenna radiation area having a second length along the second direction, the second length being less than the first length;

a first ground area disposed along the second direction and corresponded to the first antenna radiation area, a first distance along the second direction being between the first ground area and the first antenna radiation area;

a second ground area disposed along the second direction and corresponded to the second antenna radiation area, a second distance along the second direction being between the second ground area and the second antenna radiation area;

a first variable capacitance, disposed in between the first antenna radiation area and the first ground area along the first direction, the first antenna radiation area being connected with the first ground area; and a second variable capacitance, disposed in between the first antenna radiation area and the second ground area along the first direction, the first antenna radiation area being connected with the second ground area.

* * * * *